(12) United States Patent
Sandberg et al.

(10) Patent No.: US 11,717,772 B2
(45) Date of Patent: Aug. 8, 2023

(54) CONDENSATE SEPARATOR SYSTEM FOR VACUUM MICROWAVE DEHYDRATORS

(71) Applicant: 1140522 B.C. Ltd., Vancouver (CA)

(72) Inventors: Gary Sandberg, Vancouver (CA); Timothy Durance, Vancouver (CA)

(73) Assignee: 1140522 B.C. Ltd., Vancouver (CA)

( * ) Notice: Subject to any disclaimer, the term of this patent is extended or adjusted under 35 U.S.C. 154(b) by 61 days.

(21) Appl. No.: 17/529,717

(22) Filed: Nov. 18, 2021

(65) Prior Publication Data

US 2022/0152525 A1    May 19, 2022

Related U.S. Application Data

(60) Provisional application No. 63/116,062, filed on Nov. 19, 2020.

(51) Int. Cl.
*B01D 5/00* (2006.01)
*B01D 17/02* (2006.01)
*C02F 1/40* (2023.01)
*F26B 3/347* (2006.01)
*F26B 5/04* (2006.01)
*F26B 25/00* (2006.01)
(Continued)

(52) U.S. Cl.
CPC ....... *B01D 17/0214* (2013.01); *B01D 5/0006* (2013.01); *B01D 5/0045* (2013.01); *B01D 5/0057* (2013.01); *C02F 1/40* (2013.01); *F26B 3/347* (2013.01); *F26B 5/04* (2013.01); *F26B 25/006* (2013.01); *B01D 1/0029* (2013.01); *C02F 2101/32* (2013.01); *C02F 2201/005* (2013.01); *C02F 2209/42* (2013.01)

(58) Field of Classification Search
CPC .. B01D 5/0006; B01D 5/0045; B01D 5/0058; B01D 17/0214; C02F 1/40; F26B 3/347; F26B 5/04; F26B 25/006
See application file for complete search history.

(56) References Cited

U.S. PATENT DOCUMENTS

| | | | |
|---|---|---|---|
| 4,640,020 A * | 2/1987 | Wear | H05B 6/78 34/68 |
| 4,746,968 A * | 5/1988 | Wear | A23L 3/54 34/259 |
| 5,672,370 A | 9/1997 | Durance et al. | |

(Continued)

FOREIGN PATENT DOCUMENTS

CA    3078044 A1    10/2021

OTHER PUBLICATIONS

International Search Report & Written Opinion dated Oct. 21, 2021 from related application PCT/CA2021/050498 (13 pages).

*Primary Examiner* — Jonathan Miller
(74) *Attorney, Agent, or Firm* — Calderon, Safran & Cole P.C.

(57) ABSTRACT

This invention was designed to condense, separate and collect volatile compounds from the vapor steam as they exit the dehydrator. Bulk condensate is allowed to accumulate and separate in a separator vessel under vacuum. The undesirable water phase condensate is periodically drained into a water vessel, which is also held under vacuum instead of atmospheric pressure to avoid agitation and mixing of the contents of the separator vessel arising from purging the separator vessel to atmosphere. The separated and desirable oily condensates can then be easily recovered from the separator vessel.

15 Claims, 5 Drawing Sheets

(51) Int. Cl.
  *C02F 101/32*      (2006.01)
  *B01D 1/00*        (2006.01)

(56)              References Cited

U.S. PATENT DOCUMENTS

| | | |
|---|---|---|
| 5,676,989 A    | 10/1997  | Durance et al. |
| 5,956,865 A    |  9/1999  | Durance et al. |
| 5,962,057 A    | 10/1999  | Durance et al. |
| 5,972,397 A    | 10/1999  | Durance et al. |
| 6,128,831 A    | 10/2000  | Durance et al. |
| 6,312,745 B1   | 11/2001  | Durance et al. |
| 6,413,435 B1 * |  7/2002  | Kyles ................... B01D 17/00 |
| | | 210/194 |
| 8,718,113 B2   |  5/2014  | Durance et al. |
| 8,722,749 B2   |  5/2014  | Durance et al. |
| 8,877,469 B2   | 11/2014  | Durance et al. |
| 9,267,734 B2   |  2/2016  | Durance et al. |
| 9,273,901 B2   |  3/2016  | Fu et al. |
| 9,316,437 B2   |  4/2016  | Fu et al. |
| 9,958,203 B2   |  5/2018  | Fu et al. |
| 10,023,857 B2  |  7/2018  | Durance et al. |
| 10,029,190 B2* |  7/2018  | Kennedy ............. B01D 17/12 |
| 10,139,160 B2  | 11/2018  | Fu et al. |
| 10,139,161 B2  | 11/2018  | Fu et al. |
| 10,178,873 B2  |  1/2019  | Durance et al. |
| 10,578,359 B2  |  3/2020  | Durance et al. |
| 10,682,590 B2* |  6/2020  | Kennedy ........... B01D 17/0214 |
| 10,844,366 B2  | 11/2020  | Durance et al. |
| 11,278,635 B2  |  3/2022  | Durance et al. |
| 2016/0367912 A1* | 12/2016 | Kennedy ............... E02B 15/045 |

* cited by examiner

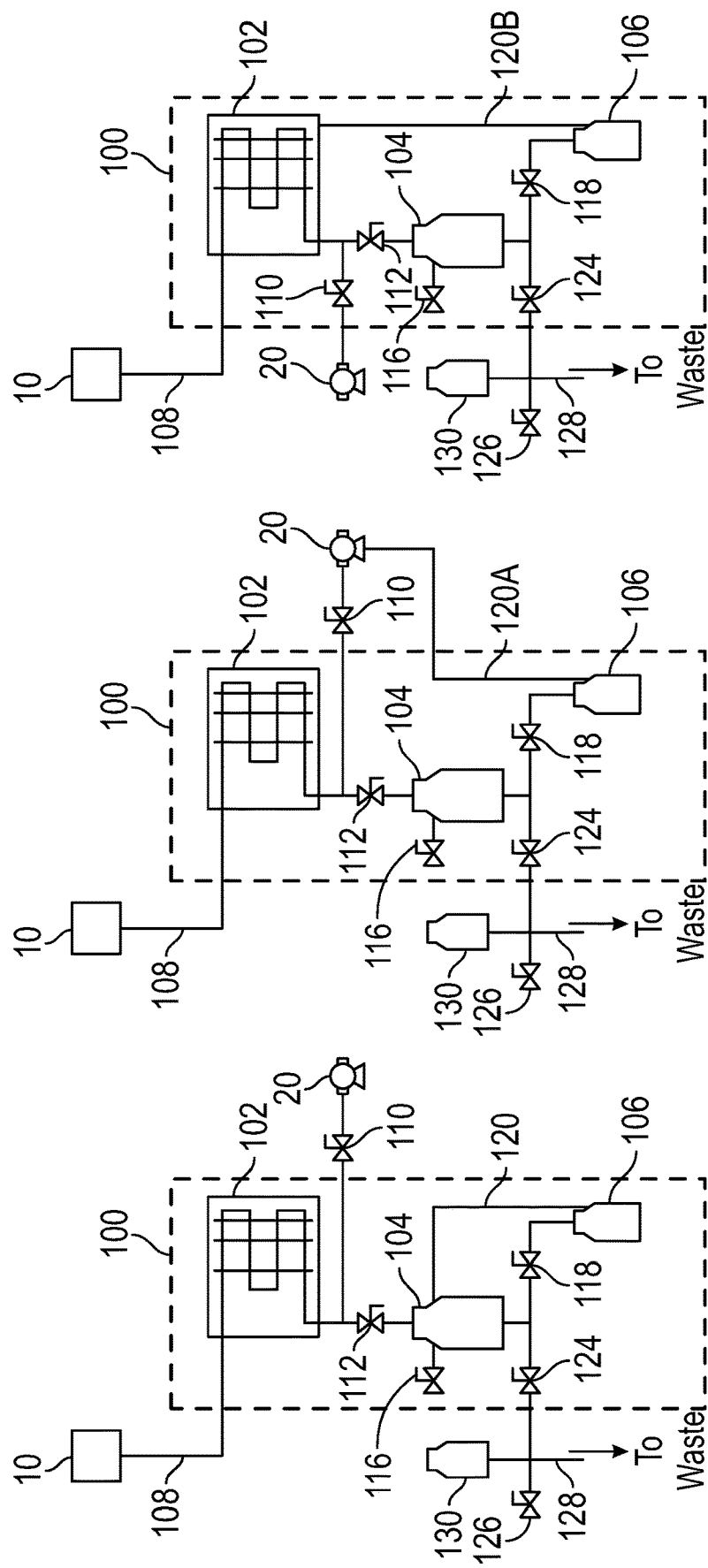

CONDENSATE SEPARATOR SYSTEM FOR VACUUM MICROWAVE DEHYDRATORS

FIELD OF THE INVENTION

This invention relates to vacuum microwave dehydration. In particular, this invention relates to improvements to condensate separators for vacuum microwave dehydrators.

BACKGROUND OF THE INVENTION

In vacuum microwave dehydration, components of the feedstock become separated into non-volatile and volatile components; non-volatiles are retained in the dry material while volatiles are largely collected in the condensate. Typical condensates are largely water, but other volatiles may also be condensed, and some condensate components may be valuable. When condensates contain fat-soluble materials as well as water-soluble materials, the oily materials will coalesce into droplets over time and float as a layer upon the surface of the water phase in the condensate collection vessel. However, when the vacuum of the condensate collection vessel is released to drain the water phase into a water collection vessel maintained at atmospheric pressure, the inrush of air mixes the layers together, making it difficult to separate the fat-soluble layer.

It is therefore an object of this invention to provide a condensate separator system that prevents mixing of fat- and water-soluble layers during condensate separation.

It is a further object of the invention to provide a method of using a condensate separator system to extract valuable fat-soluble volatiles from a vacuum microwave dehydrator condensate stream.

These and other objects will be better understood by reference to this application as a whole. Not all of the objects are necessarily met by all embodiments of the invention described below or by the invention defined by each of the claims.

SUMMARY OF THE INVENTION

In one aspect, the invention comprises a condensate separator system for a vacuum microwave dehydrator comprising a condenser, a separator vessel, a water chamber, and an equalizer line connecting the separator vessel to the water chamber. During operation, the condenser and separator vessel are held under vacuum by means of a vacuum pump. The equalizer line maintains the separator vessel and water chamber at substantially the same pressure. The is water chamber is also maintained at vacuum through the equalizer line between the separator vessel and water chamber. Alternatively, the water chamber could be maintained at vacuum by a vacuum line directly to the vacuum pump.

In another aspect, the invention comprises a condensate separator system for a vacuum microwave dehydrator comprising a condenser connected in-line between the vacuum microwave dehydrator and a vacuum pump, a separator vessel, a separator valve connecting the condenser to the separator vessel for isolating the separator vessel from the condenser and vacuum pump, a water vessel, a water valve connecting the separator vessel to the water vessel for preventing condensate flow from the separator vessel to the water vessel, and a pressure equalizer line connecting the separator vessel to the water vessel, wherein said pressure equalizer line maintains the separator vessel and the water vessel at substantially the same pressure.

In another aspect, the invention comprises a method for separating oily condensate from water condensate using a condensate separator system for a vacuum microwave dehydrator as described above. The water valve is closed to prevent condensate flow from the separator vessel to the water chamber. The separator valve between the condenser and separator vessel is opened to allow condensate to flow into the separator vessel. As drying proceeds, condensate accumulates in the separator vessel and can be monitored in a sight glass mounted to the separator vessel. Oily condensates such as terpenes may accumulate as a separate fat-soluble layer floating on top of a condensate water phase. If the separator vessel becomes full during a process, an operator can close a separator valve to isolate the separator vessel from the condenser and open the water valve to drain the condensate water phase into the water chamber (also maintained under vacuum due to the pressure equalizer line connecting the separator vessel to the water chamber), and open a bleed valve on the separator vessel slightly to allow a small amount of air into the separation vessel to replace the volume occupied by the condensate water phase. When substantially all of the water phase is drained from the separator vessel, the water valve is closed and the separator valve is re-opened, allowing condensate to accumulate in the separator vessel again and thereby allowing the oily phase to accumulate in the separator vessel throughout the batch dehydration, or through multiple batches. When sufficient fat-soluble layer is accumulated in the separator vessel, the separator valve and water chamber valve are closed and atmospheric air is released into the separator using the bleed valve. A collection valve is opened to release the fat-soluble material. This provides a convenient and economical means of creating a valuable secondary product stream from vacuum microwave dehydration.

In another aspect, the invention comprises a method for separating water condensate from oily condensate comprising: providing a condensate separator system for a vacuum microwave dehydrator comprising a condenser connected in-line between the vacuum microwave dehydrator and a vacuum pump, a separator vessel, a separator valve connecting the condenser to the separator vessel for isolating the separator vessel from the condenser and vacuum pump, a water vessel, a water valve connecting the separator vessel to the water vessel for preventing condensate flow from the separator vessel to the water vessel, a bleed valve in the separator vessel, a collection valve in the separator vessel, and a pressure equalizer line connecting the separator vessel to the water vessel; closing the water valve, bleed valve, and collection valve; opening the separator valve to allow mixed condensate to enter the separator vessel; allowing the mixed condensate to accumulate and separate into water condensate and oily condensate in the separator vessel; closing the separator valve; opening the water valve; opening the bleed valve slightly to allow air to slowly enter the separator vessel and the water vessel through the pressure is equalizer line, thereby draining substantially all of the water condensate into the water vessel; closing the water valve; opening the bleed valve completely to purge the separator vessel to atmospheric pressure; and opening the collection valve to collect the oily condensate.

According to another aspect of the invention, a condensate separator system for a vacuum microwave dehydrator (VMD) comprises a separator vessel in selective fluid communication with a vacuum chamber of the VMD, a water vessel in selective fluid communication with the separator vessel, and an equalizer line connecting the separator vessel to the water vessel, wherein the separator vessel and the water vessel are maintained at substantially the same pressure by the equalizer line.

According to a further aspect, the condensate separator system comprises temperature control means for at least one wall of the vacuum chamber. The temperature control means may be a cooling jacket.

According to a further aspect, the condensate separator system further comprises a condenser in fluid communication with the vacuum chamber and in fluid communication with a vacuum pump of the VMD, wherein the condenser is in selective fluid communication with the separator vessel and the separator vessel is in selective fluid communication with the vacuum chamber through the condenser.

According to a further aspect, the separator vessel comprises a level sensor. The level sensor may be a sight glass.

According to a further aspect, the separator vessel comprises a bleed valve for selective fluid communication between the separator vessel and the atmosphere.

According to a further aspect, the condensate separator system comprises a first drain valve for controlling fluid communication between the separator vessel and the water vessel. The condensate separator system may further comprise a second drain valve in fluid communication with the separator vessel. The second drain valve may be in fluid communication with an oily condensate vessel. The second drain valve may be in fluid communication with a faucet. The second drain valve may be in fluid communication with a waste disposal line.

According to another aspect of the invention, a condensate separator system for a vacuum microwave dehydrator (VMD) comprises a condenser in fluid communication with a vacuum chamber of the VMD, a vacuum pump of the VMD in selective fluid communication with the condenser, a separator vessel in selective fluid communication with the condenser, a water vessel in selective fluid communication with the separator vessel, and an equalizer line connecting the water vessel to one of the separator vessel, the condenser, and the vacuum pump, wherein the separator vessel and the water vessel are maintained at substantially the same pressure by the equalizer line and the vacuum pump.

According to another aspect of the invention, a method of separating a mixed condensate stream from a vacuum microwave dehydrator (VMD) into an oily condensate and a water condensate comprises providing a condensate separator system for the VMD, the condensate separator system comprising a condenser in fluid communication with a vacuum chamber of the vacuum microwave dehydrator, a vacuum pump of the vacuum microwave dehydrator in fluid communication with the condenser, a separator vessel in selective fluid communication with the condenser, a bleed valve for selective fluid communication between the separator vessel and the atmosphere, a first drain valve for controlling fluid communication between the separator vessel and a water vessel, and an equalizer line connecting the separator vessel to the water vessel, wherein the separator vessel and the water vessel are maintained at substantially the same pressure by the equalizer line, operating the vacuum microwave dehydrator until the separator vessel is at least partially filled with the is mixed condensate and the mixed condensate has separated into a first layer comprising the oily condensate and a second layer comprising the water condensate, isolating the separator vessel from fluid communication with the condenser, partially opening the bleed valve to increase pressure in the separator vessel; and opening the first drain valve to drain the second layer from the separator vessel to the water vessel.

According to a further aspect, the condenser separator system comprises a second drain valve in fluid communication with the separator vessel and the method comprises closing the first drain valve, fully opening the bleed valve, and opening the second drain valve to remove the first layer from the separator vessel.

The foregoing may cover only some of the aspects of the invention. Other and sometimes more particular aspects of the invention will be appreciated by reference to the following description of at least one preferred mode for carrying out the invention in terms of one or more examples. The following mode(s) for carrying out the invention are not a definition of the invention itself, but are only example(s) that embody the inventive features of the invention.

BRIEF DESCRIPTION OF THE DRAWINGS

At least one mode for carrying out the invention in terms of one or more examples will be described by reference to the drawings thereof in which:

FIG. 5 is a process flow diagram of the vacuum microwave dehydrator and condensate separator system;

FIG. 5A is a process flow diagram according to a third embodiment of the invention of a condensate separator system; and FIG. 5B is a process flow diagram according to a fourth embodiment of the invention of a condensate separator system.

DETAILED DESCRIPTION OF AT LEAST ONE MODE FOR CARRYING OUT THE INVENTION IN TERMS OF EXAMPLE(S)

Figure 1:
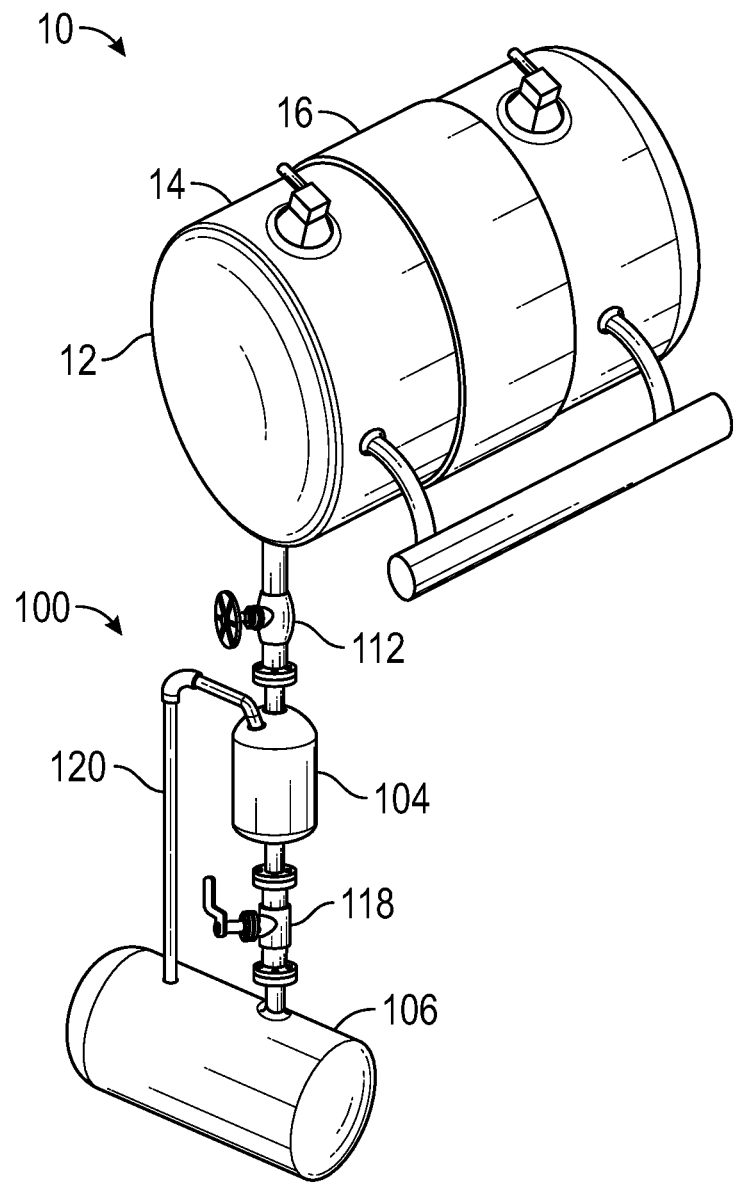
FIG. 1 is a perspective view according to a first embodiment of the invention of a condensate separator system.
Figure 2:
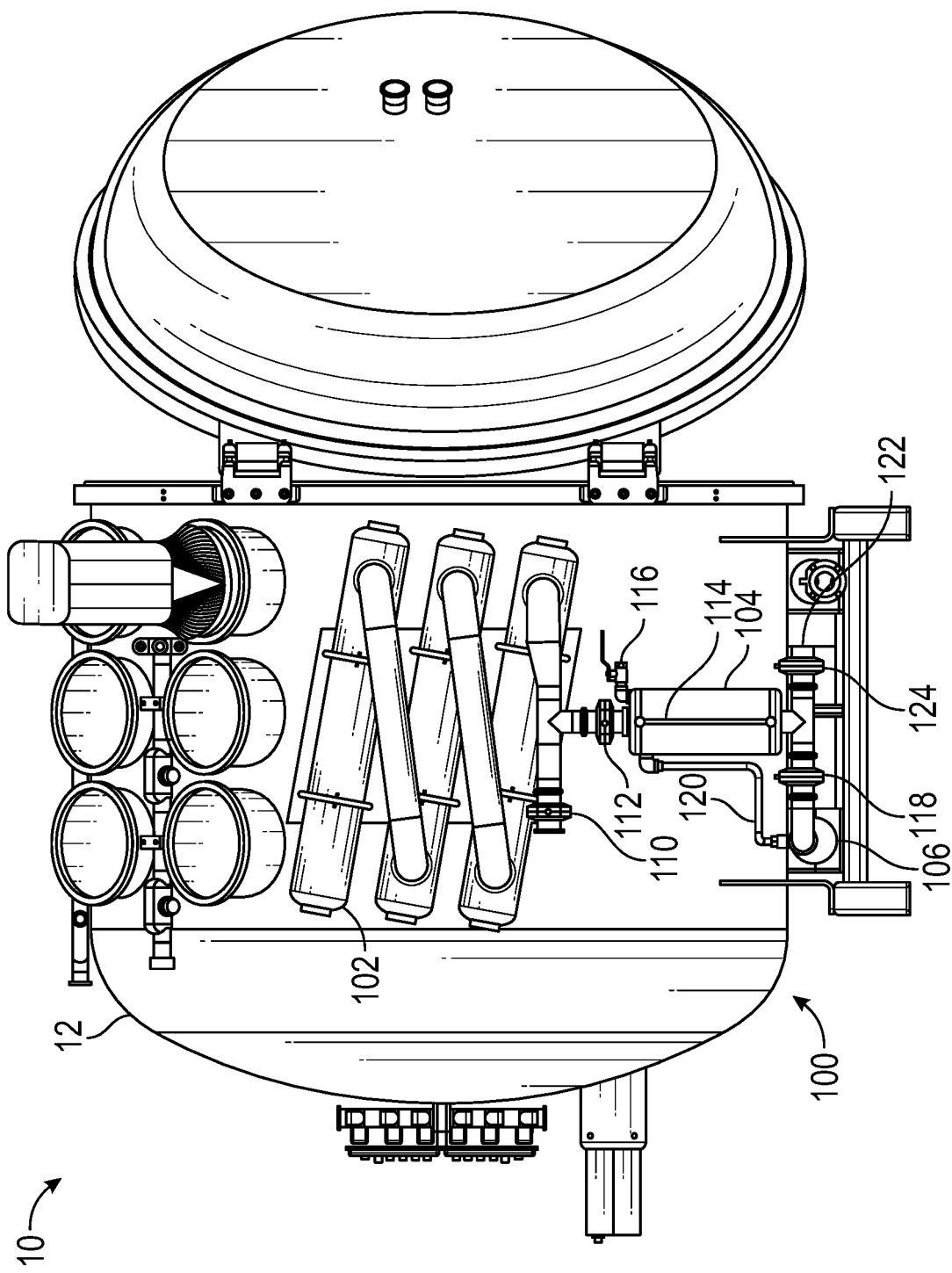
FIG. 2 is a side view of a vacuum microwave dehydrator with the preferred second embodiment of a condensate separator system attached.
Figure 3:
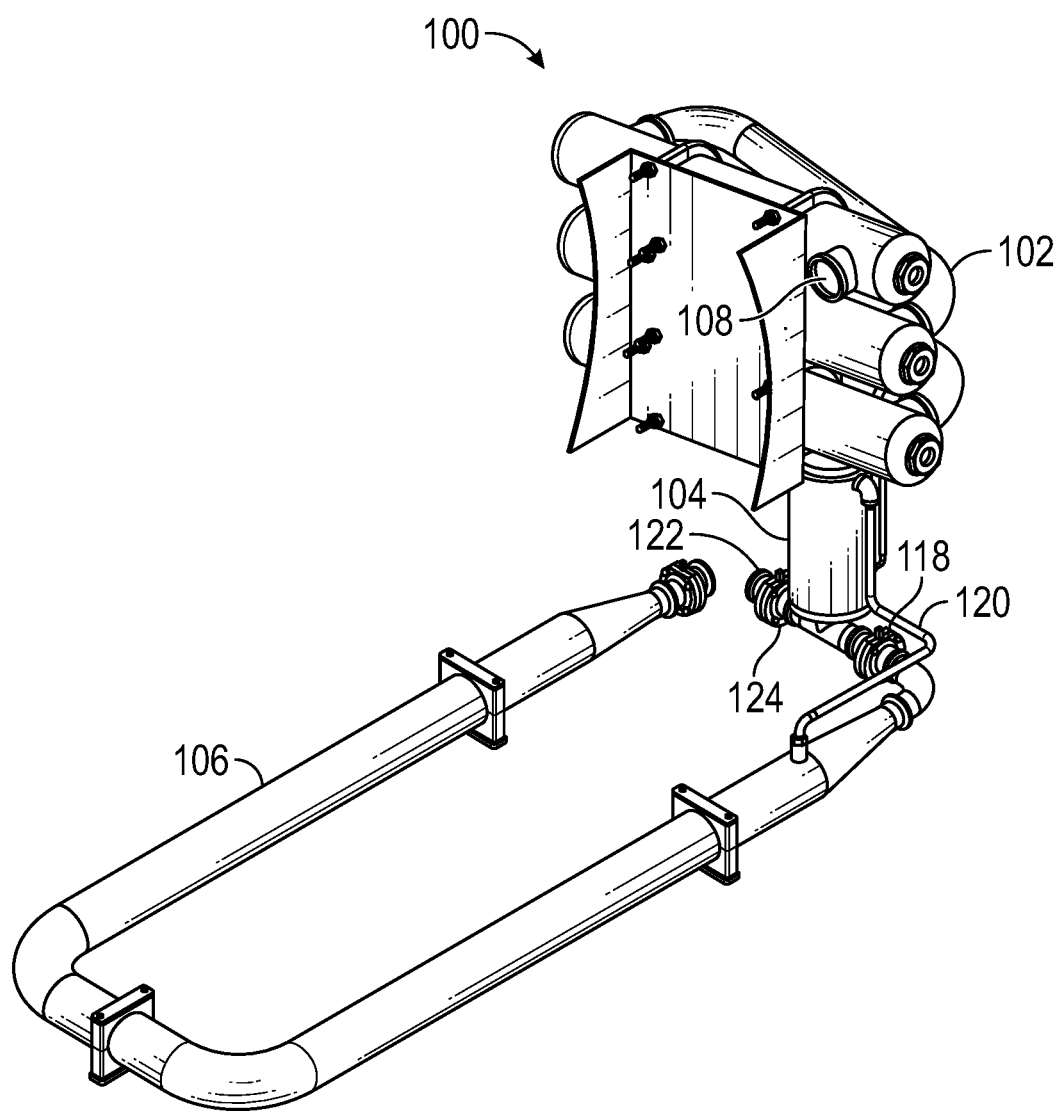
FIG. 3 is an isometric view of the condensate separator system of FIG. 2.
Figure 4:
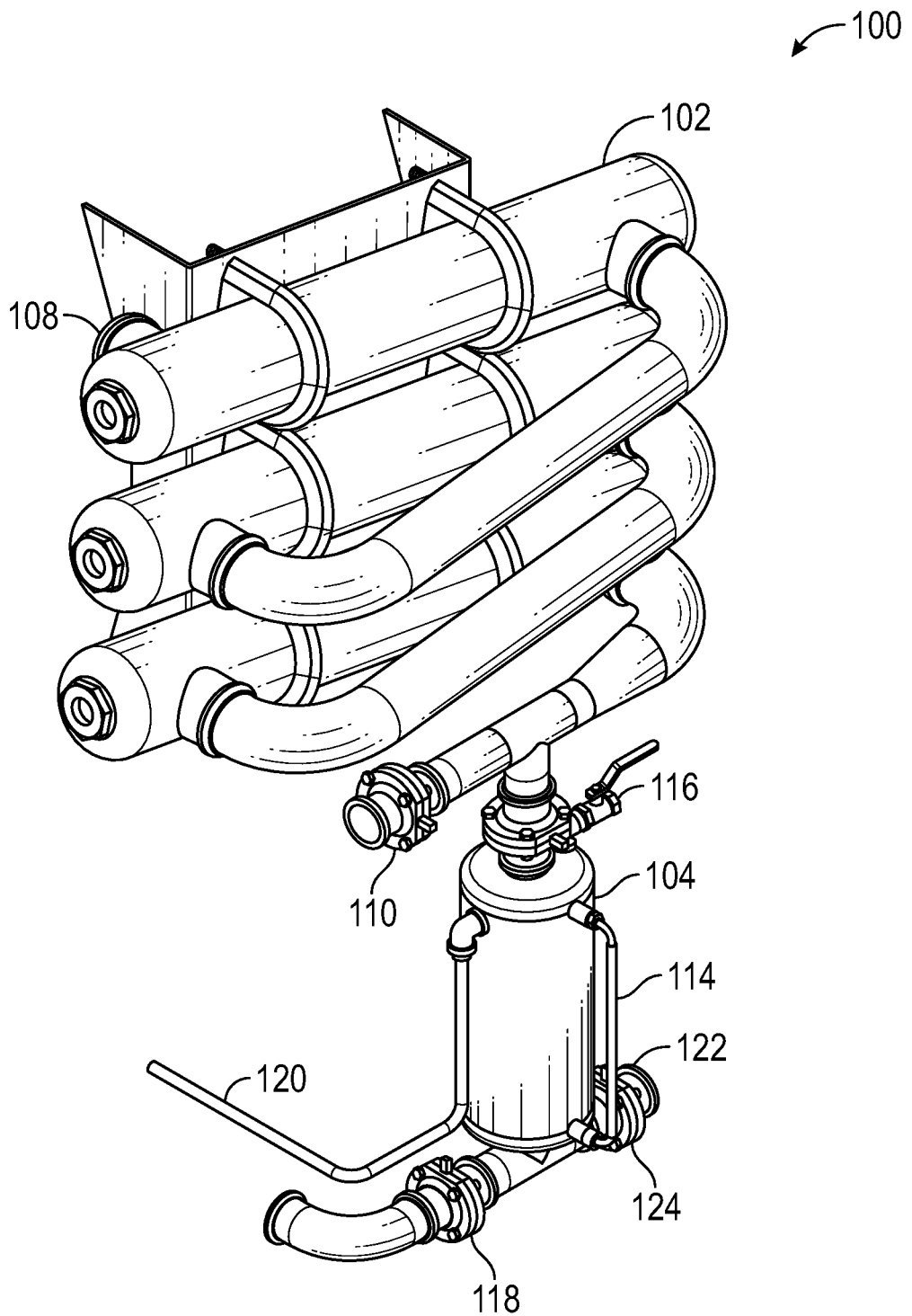
FIG. 4 is an isometric view of the condensate separator system of FIG. 2 with the water vessel and a portion of the equalizer line removed.

Referring to FIG. 1, according to an embodiment of the invention, a condensate separator system 100 for a vacuum microwave dehydrator ("VMD") 10 comprises a separator vessel 104 in selective fluid communication with a vacuum chamber 12 of the VMD 10 by means of a separator valve 112. The separator vessel 104 is in selective fluid communication with a water vessel 106 by means of a first drain valve 118. An equalizer line 120 connects the water vessel 106 to the separator vessel 104. Regardless of whether the first drain valve 118 is open or closed, the equalizer line 120 provides an independent channel for preferably substantially gas-only fluid communication between the separator vessel 104 and the water vessel 106. Accordingly, the separator vessel 104 and water vessel 106 are maintained at substantially equal pressure by the equalizer line 120.

When the VMD 10 operates, water within a feedstock in the vacuum chamber 12 is vaporized and escapes the feedstock. Oily volatiles may also be vaporized or aerosolized and freed from the feedstock. The water vapor and oil vapor or oil aerosol may condense and coalesce upon contact with a wall 14 of vacuum chamber 12. The resulting water condensate and oily droplets will run down the wall 14 and drain into the separator vessel 104. The wall 14 is preferably equipped with a temperature control means 16, such as a cooling jacket, to promote condensation on the wall 14. Inside the separator vessel 104, the water condensate and oily droplets will separate into a denser water layer and a less dense fat layer. Once full, the separator vessel 104 can be isolated from fluid communication with the vacuum chamber 12 by valve 112. The first drain valve 118 can then be opened and the water layer will preferentially drain under gravity into the water vessel 106, resulting in only the fat layer remaining in the separator vessel 104. The process can then be repeated until a significant fat layer is accumulated in the separator vessel 104, at which point the fat layer can be evacuated from the separator vessel 104.

Referring to FIGS. 2 to 5, according to a preferred embodiment of the invention, the condensate separator system 100 for the VMD 10 comprises a condenser 102, the separator vessel 104, and the water vessel 106. A suction port 108 of condenser 102 is connected to the vacuum chamber 12 of the VMD 10. The condenser 102 terminates in a vacuum pump valve 110, which isolates the condenser 102 from a vacuum pump 20. Under operation, the vacuum pump 20 draws a mixed volatile stream from the VMD 10 into the condenser 102 through the suction port 108. In the condenser 102, the mixed volatile stream is condensed into a mixed condensate. The mixed condensate then drains into the separator vessel 104. The mixed condensate consists of a primary condensate, i.e. the water layer, and a secondary condensate which comprises any number of oily substances, i.e. the fat layer.

The separator vessel 104 is connected to the condenser 102 by the separator valve 112, allowing the separator vessel 104 to be isolated from the condenser 102 while the VMD 10 is still operating. A level sensor, which is preferably a sight glass 114, is mounted to the separator vessel 104. The sight glass 114 allows an operator of the VMD 10 to monitor the contents of the separator vessel 104. A bleed valve 116 allows the separator vessel 104 to selectively communicate with the atmosphere.

The water vessel 106 is connected to the separator vessel 104 by the first drain valve 118 to prevent or allow condensate to drain from the separator vessel 104 to the water vessel 106. The equalizer line 120 connects the separator vessel 104 with the water vessel 106 to maintain the water vessel 106 at substantially the same pressure as the separator vessel 104, thus removing the need to purge the separator vessel 104 to atmosphere before draining the primary condensate from the separator vessel 104 and into the water vessel 106. The equalizer line 120 connects to a top portion of the separator vessel 104 and to a top portion of the water vessel 106 so that under normal operation only gases are allowed to move between the separator vessel 104 and the water vessel 106. That is, when the vacuum pump 20 is operating, gases are drawn from the water vessel 106 to the separator vessel 104 and from there through the separator valve 112 to the condenser 102 and on to the vacuum pump 20. Conversely, if the bleed valve 116 is opened, atmospheric air enters the separator vessel 104 and passes through the equalizer line 120 to the water vessel 106.

A collection point 122 is connected to the separator vessel 104 by a second drain valve 124 to allow the collection point 122 to be isolated from the separator vessel 104. Depending on the nature of the secondary condensate, the collection point 122 may be connected to, as non-limiting examples, a secondary collection tank 130, a faucet 126, or a waste drain 128.

A preferred method for operating the VMD 10 with the condenser separator system 100 will now be described. The preferred method is in reference to a batch-processing VMD. However, the person skilled in the art will readily recognize that this method can be easily adapted to a continuously operating VMD.

First, a batch of feedstock is loaded into VMD 10. The vacuum pump valve 110 and separator valve 112 are opened, and the first and second drain valves 118, 124 are closed. The vacuum pump 20 is activated to reduce the pressure within VMD 10 from atmospheric to vacuum.

As VMD 10 operates, water contained within the feedstock is vaporized. To a lesser extent, fat-soluble volatiles are also vaporized. The mixed volatile stream is drawn through the suction port 108 into the condenser 102, where it cools and condenses into the mixed condensate. The mixed condensate drains out of condenser 102 through the separator valve 112 and into the separator vessel 104.

The mixed condensate is allowed to accumulate inside the separator vessel 104. Over time, the two fluids separate into discrete layers that remain separate unless agitated. In most circumstances, the secondary condensate, or fat layer, is less dense than the primary condensate, or water layer, and so will float on top of the water layer.

The operator is able to monitor the accumulation of mixed condensate inside the separator vessel 104 using the sight glass 114. Once the separator vessel 104 is full, the operator closes the separator valve 112 and opens the first drain valve 118. The bleed valve 116 is opened slightly to allow air to slowly replace the water layer in the separator vessel 104 as the water layer drains through the first drain valve 118 into the water vessel 106, which is maintained at the same pressure as the separator vessel 104 through the equalization line 120. As the water vessel 106 is maintained at the same pressure as the separator vessel 104, rather than at atmospheric pressure, it is not necessary to purge the separator vessel 104 to full atmospheric pressure, thereby avoiding a rapid inrush of air to the separator vessel 104, which would agitate the water and fat layers and cause them to mix together again.

When all or substantially all of the water layer has been drained out of the separator vessel 104, the bleed valve 116 and first drain valve 118 are closed and the separator valve 112 is reopened, allowing the process to repeat. Depending on the characteristics of the feedstock, this process may need to be undertaken multiple times for a given batch, between batches, or across multiple batches.

The fat layer will also accumulate within the separator vessel 104, albeit in most cases at a much slower rate than the water layer. However, as the process described above is repeated multiple times, the fat layer will eventually reach a substantial quantity and need to be collected out of the separator vessel 104. To do so, first the water layer is drained out of the separator vessel 104, as described above. Next, the separator valve 112 and first drain valve 118 are closed. The bleed valve 116 is opened fully to allow atmospheric air into the separator vessel 104 (due to the equalizer line 120, atmospheric air will also enter the water vessel 106 until both the separator vessel 104 and the water vessel 106 are at atmospheric pressure). Once the separator vessel 104 is at atmospheric pressure, the second drain valve 124 is opened, allowing the fat layer to drain out of the separator vessel 104 to the collection point 122, where it can be collected using suitable means and further processed as needed. Finally, the second drain valve 124 and bleed valve 116 are closed, the separator valve 112 is re-opened, and the entire process can repeat.

Referring to FIG. 5A, in another embodiment the equalizer line 120A connects the water vessel 106 to an inlet of the vacuum pump 20. When the VMD 10 operates, the water vessel 106 is maintained at vacuum pressure by the vacuum pump 20 directly, while the separator vessel 104 is also maintained at vacuum pressure through fluid communication with the condenser 102, the condenser 102 being in fluid communication with the vacuum pump 20.

Referring to FIG. 5B, in another embodiment the equalizer line 120B connects the is water vessel 106 to the condenser 102. When the VMD 10 operates, the water vessel 106 is maintained at vacuum pressure by communication with the condenser 102 through the equalizer line 120B, while the separator vessel is maintained at vacuum pressure. However, this embodiment is not as preferred as it requires at least isolating the vacuum pump 20 from the condenser 102, and by extension the vacuum chamber 12 from the vacuum pump 20, making it much more difficult to continue operating the VMD 10 while the separator vessel 104 is drained.

In the foregoing description, exemplary modes for carrying out the invention in terms of examples have been described. However, the invention should not be limited by those examples, but should be given the broadest interpretation consistent with the description as a whole. The specification and drawings are, accordingly, to be regarded in an illustrative rather than a restrictive sense.

The invention claimed is:

1. A condensate separator system for a vacuum microwave dehydrator (VMD) comprising:
   a separator vessel in selective fluid communication with a vacuum chamber of said VMD;
   a water vessel in selective fluid communication with said separator vessel; and
   an equalizer line connecting said separator vessel to said water vessel;
   wherein said separator vessel and said water vessel are maintained at substantially the same pressure by said equalizer line.

2. The condensate separator system of claim 1 further comprising temperature control means for at least one wall of said vacuum chamber.

3. The condensate separator system of claim 2 wherein said temperature control means is a cooling jacket.

4. The condensate separator system of claim 1 further comprising:
   a condenser in fluid communication with said vacuum chamber and in fluid communication with a vacuum pump of said VMD;
   wherein said condenser is in selective fluid communication with said separator vessel and said separator vessel is in selective fluid communication with said vacuum chamber through said condenser.

5. The condensate separator system of claim 1, wherein said separator vessel further comprises a level sensor.

6. The condensate separator system of claim 5, wherein said level sensor is a sight glass.

7. The condensate separator system of claim 1, wherein said separator vessel further comprises a bleed valve for selective fluid communication between said separator vessel and the atmosphere.

8. The condensate separator system of claim 1, comprising a first drain valve for controlling fluid communication between said separator vessel and said water vessel.

9. The condensate separator system of claim 8, further comprising a second drain valve in fluid communication with said separator vessel.

10. The condensate separator system of claim 9, wherein said second drain valve is in fluid communication with an oily condensate vessel.

11. The condensate separator system of claim 9, wherein said second drain valve is in fluid communication with a faucet.

12. The condensate separator system of claim 9, wherein said second drain valve is in fluid communication with a waste disposal line.

13. A condensate separator system for a vacuum microwave dehydrator (VMD) comprising:
   a condenser in fluid communication with a vacuum chamber of said VMD;
   a vacuum pump of said VMD in selective fluid communication with said condenser;
   a separator vessel in selective fluid communication with said condenser;
   a water vessel in selective fluid communication with said separator vessel; and
   an equalizer line connecting said water vessel to one of said separator vessel, said condenser, and said vacuum pump;
   wherein said separator vessel and said water vessel are maintained at substantially the same pressure by said equalizer line and said vacuum pump.

14. A method of separating a mixed condensate stream from a vacuum microwave dehydrator (VMD) into an oily condensate and a water condensate, said method comprising;
   providing a condensate separator system for said VMD, said condensate separator system comprising:
      a condenser in fluid communication with a vacuum chamber of said vacuum microwave dehydrator;
      a vacuum pump of said vacuum microwave dehydrator in fluid communication with said condenser;
      a separator vessel in selective fluid communication with said condenser;
      a bleed valve for selective fluid communication between said separator vessel and the atmosphere;
      a first drain valve for controlling fluid communication between said separator vessel and a water vessel; and
      an equalizer line connecting said separator vessel to said water vessel, wherein said separator vessel and said water vessel are maintained at substantially the same pressure by said equalizer line;
   operating said vacuum microwave dehydrator until said separator vessel is at least partially filled with said mixed condensate and said oily condensate and a second layer comprising said water condensate;
   isolating said separator vessel from fluid communication with said condenser;
   partially opening said bleed valve to increase pressure in said separator vessel; and
   opening said first drain valve to drain said second layer from said separator vessel to said water vessel.

15. The method of claim 14 wherein said condenser separator system further comprises a second drain valve in fluid communication with said separator vessel and wherein said method further comprises:
   closing said first drain valve;
   fully opening said bleed valve; and
   opening said second drain valve to remove said first layer from said separator vessel.

* * * * *